(12) United States Patent  (10) Patent No.: US 9,114,536 B2
Sussman  (45) Date of Patent: Aug. 25, 2015

(54) ELECTRONIC EMERGENCY-STOP BRAKING CIRCUIT FOR ROBOTIC ARMS

(75) Inventor: Michael Sussman, Winchester, MA (US)

(73) Assignee: Rethink Robotics, Inc., Boston, MA (US)

( * ) Notice: Subject to any disclaimer, the term of this patent is extended or adjusted under 35 U.S.C. 154(b) by 38 days.

(21) Appl. No.: 13/446,650

(22) Filed: Apr. 13, 2012

(65) Prior Publication Data

US 2013/0271046 A1    Oct. 17, 2013

(51) Int. Cl.
*H02P 3/12* (2006.01)
*H02P 3/22* (2006.01)
*B25J 19/00* (2006.01)
*B25J 19/06* (2006.01)
*H02P 3/02* (2006.01)

(52) U.S. Cl.
CPC .............. *B25J 19/0004* (2013.01); *B25J 19/06* (2013.01); *H02P 3/02* (2013.01)

(58) Field of Classification Search
USPC ............ 318/109, 375, 376, 400.21, 379, 362, 318/371
See application file for complete search history.

(56) References Cited

U.S. PATENT DOCUMENTS

| | | | |
|---|---|---|---|
| 4,767,970 A | 8/1988 | Rodal | |
| 4,831,469 A * | 5/1989 | Hanson et al. | 360/75 |
| 5,017,849 A | 5/1991 | Ey-Rang | |
| 6,094,024 A * | 7/2000 | Westlake | 318/375 |
| 6,097,225 A * | 8/2000 | Smith | 327/143 |
| 6,169,391 B1 * | 1/2001 | Lei | 323/266 |
| 6,310,452 B1 * | 10/2001 | Deck et al. | 318/273 |
| 6,548,973 B1 * | 4/2003 | Chloupek et al. | 318/375 |
| 6,573,681 B2 | 6/2003 | Schwesig | |
| 6,917,856 B2 | 7/2005 | Murata | |
| 6,943,510 B2 * | 9/2005 | Gorti | 318/275 |
| 7,898,196 B2 | 3/2011 | Horikoshi et al. | |
| 8,093,844 B2 * | 1/2012 | Milesi et al. | 318/362 |
| 2004/0227479 A1 * | 11/2004 | Youm | 318/375 |
| 2005/0218846 A1 * | 10/2005 | Moser et al. | 318/376 |

(Continued)

FOREIGN PATENT DOCUMENTS

DE    102007059492 A1    6/2009
EP    1974870    10/2008

(Continued)

OTHER PUBLICATIONS

International Search Report and Written Opinion mailed Sep. 24, 2013 for International Application No. PCT/US2013/035709 (13 pages).

(Continued)

*Primary Examiner* — Paul Ip
*Assistant Examiner* — Devon Joseph
(74) *Attorney, Agent, or Firm* — Morgan, Lewis & Bockius LLP

(57) ABSTRACT

Representative embodiments of a system for braking a cyclically rotating motor upon a power failure include (i) charge-storage circuitry for storing charge and converting the stored charge to an output voltage upon power failure; (ii) one or more passive electrical elements for conducting current induced by motor rotations; and (iii) voltage-actuated circuitry connected to the passive electrical element and the charge-storage circuitry for braking the motor during each half-cycle of motor rotation. The circuitry is inactive until actuated by the charge-storage circuitry upon power failure.

17 Claims, 5 Drawing Sheets

(56) References Cited

U.S. PATENT DOCUMENTS

| | | |
|---|---|---|
| 2006/0125436 A1* | 6/2006 | Lin .............................. 318/376 |
| 2007/0063661 A1* | 3/2007 | Galli et al. ................... 318/109 |
| 2008/0116828 A1* | 5/2008 | Horikoshi et al. ............ 318/273 |
| 2009/0058343 A1 | 3/2009 | Bund |
| 2010/0145519 A1 | 6/2010 | Keyl et al. |
| 2010/0288067 A1 | 11/2010 | Hofmann et al. |
| 2011/0178638 A1 | 7/2011 | Tsusaka et al. |
| 2011/0249476 A1* | 10/2011 | Chen et al. ..................... 363/52 |
| 2011/0257785 A1 | 10/2011 | Nihei et al. |
| 2013/0141025 A1* | 6/2013 | Takamori et al. ........ 318/400.21 |
| 2013/0231156 A1* | 9/2013 | Fischer ....................... 455/552.1 |

FOREIGN PATENT DOCUMENTS

| | | |
|---|---|---|
| JP | 02023080 | 1/1990 |
| JP | H0389879 A | 4/1991 |
| JP | 2007037301 A | 2/2007 |
| WO | 2013/155034 A2 | 10/2013 |
| WO | 2013/155034 A3 | 12/2013 |

OTHER PUBLICATIONS

PCT International Application No. PCT/US2013/035709, International Preliminary Report on Patentability mailed on Oct. 23, 2014, 8 pages.

* cited by examiner

ELECTRONIC EMERGENCY-STOP BRAKING CIRCUIT FOR ROBOTIC ARMS

FIELD OF THE INVENTION

In various embodiments, the present invention relates generally to electronic circuitry for generating emergency-stop braking in automated industrial systems.

BACKGROUND

Robots have been deployed across numerous industrial and manufacturing environments to promote reliability and cost savings. Robotic arms that are used to move a work tool between locations are typically driven by rotating motors via low-friction gearboxes. The low-friction gearboxes convert rotational motion with a high output efficiency, but generally permit the motor to continue moving for a significant time following an emergency stop or when power is interrupted. Additionally, the low-friction gearboxes may lead to situations where a raised robotic arm in a static position falls under gravity during the emergency stop or power failure and potentially cause damage to equipment or harm to humans. As a result, motors for robotic arms may be equipped with an emergency-stop brake to avoid these hazards.

Conventionally, one type of emergency-stop brake utilizes an electromechanical friction device with spring loading; the position of the friction device is controlled by a solenoid. During an emergency stop or loss of power, the current stops flowing through the solenoid, causing engagement of the brake and thus stopping the motor. These electromechanical brakes, however, generally "lock" the motor within a very short time and may trap a human operator located in spatial proximity. Although a secondary safety circuit may be used to release the brake, harm to the operator may result before release occurs. Furthermore, because the secondary safety release circuit is often battery powered, the reliability thereof is decreased. In addition, the electromechanical motor brake and/or the secondary safety circuit add weight and cost to the robotic system.

Another braking approach is to short-circuit the electric motor during an emergency or power failure; the short-circuited motor gradually slows down with limited mechanical wear. This approach may reduce the risk of trapping a human operator and thus avoid using a secondary safety circuit to release the brake. However, an extra independent power source—for example, a battery—is typically required to power a control logic circuit for controlling and supporting the braking circuit (or to short-circuit the motor directly) during an emergency stop or loss of power. Maintenance and the additional cost of the extra power source present a disadvantage of utilizing this approach.

Consequently, there is a need for motor brakes that can gradually reduce the speed of a motor during an emergency stop or power failure to prevent human entrapment without the need for an extra independent power source.

SUMMARY

Embodiments of the present invention cause motor braking using stored charge that is converted to an output voltage upon an emergency stop or power failure; the output voltage causes one or more motor windings to be short-circuited, so the motor speed decreases gradually. This allows the motor-driven robotic arm to slowly return to safe gravity-neutral positions and/or allows the motor to rotate upon applying an external force to the robotic arm (i.e., a back drive of the motor) without trapping a human operator. In some embodiments, voltage-actuated circuitry is activated by stored charge in charge-storage circuitry. The charge-storage circuitry provides power to operate the brake circuit during a power failure, eliminating the need for an additional power source to support activation of the voltage-actuated circuitry. Additionally, the system weight and cost are significantly reduced by using compact and inexpensive electronic components in the voltage-actuated and charge-storage circuitry, while the motor brake remains reliable during an emergency or power failure.

Accordingly, in one aspect, the invention pertains to an unpowered braking system for braking a cyclically rotating motor upon a power failure. In various embodiments, the system includes charge-storage circuitry for storing charge and converting the stored charge to an output voltage upon power failure; one or more passive electrical elements for conducting current induced by motor rotations; and voltage-actuated circuitry, connected to the passive electrical element and the charge-storage circuitry, for braking the motor. The voltage-actuated circuitry is inactive until actuated by the charge-storage circuitry upon power failure. In one implementation, the voltage-actuated circuitry brakes the motor by short-circuiting a motor winding by causing current to flow therethrough. The voltage-actuated circuitry may be activated each half-cycle of motor rotation or at a full-duty cycle of motor rotation. The charge-storage circuitry may include a capacitor; the passive electrical element may include a diode; and the voltage-actuated circuitry may include a transistor. In some embodiments, the charge-storage circuitry includes a zener diode having a breakdown voltage threshold and one or more transistors that are inactive until actuated by a sufficient voltage above the zener breakdown threshold voltage.

In some embodiments, the system further includes a bridge inverter having multiple transistors that are deactivated upon power failure. The system may further include a logic gate regulated by a controller and/or a signal indicating a power status to control activation and deactivation of the voltage-actuated circuitry. The voltage-actuated circuitry may be activated when an output of the logic gate is below a predetermined minimum voltage threshold and deactivated when the output of the logic gate is above a predetermined maximum voltage threshold.

In a second aspect, the invention relates to a method of generating motor braking upon a power failure. The method includes storing charge in a charge-storage element, converting the stored charge to an output voltage upon the power failure, and applying the voltage to short-circuit a motor winding by causing current to flow therethrough, thereby braking the motor. The motor winding may be short-circuited each half-cycle of motor rotation or at a full-duty cycle of motor rotation. In one embodiment, the motor winding is short-circuited when a speed of motor rotation is above a threshold value.

As used herein, the terms "approximately" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1A:
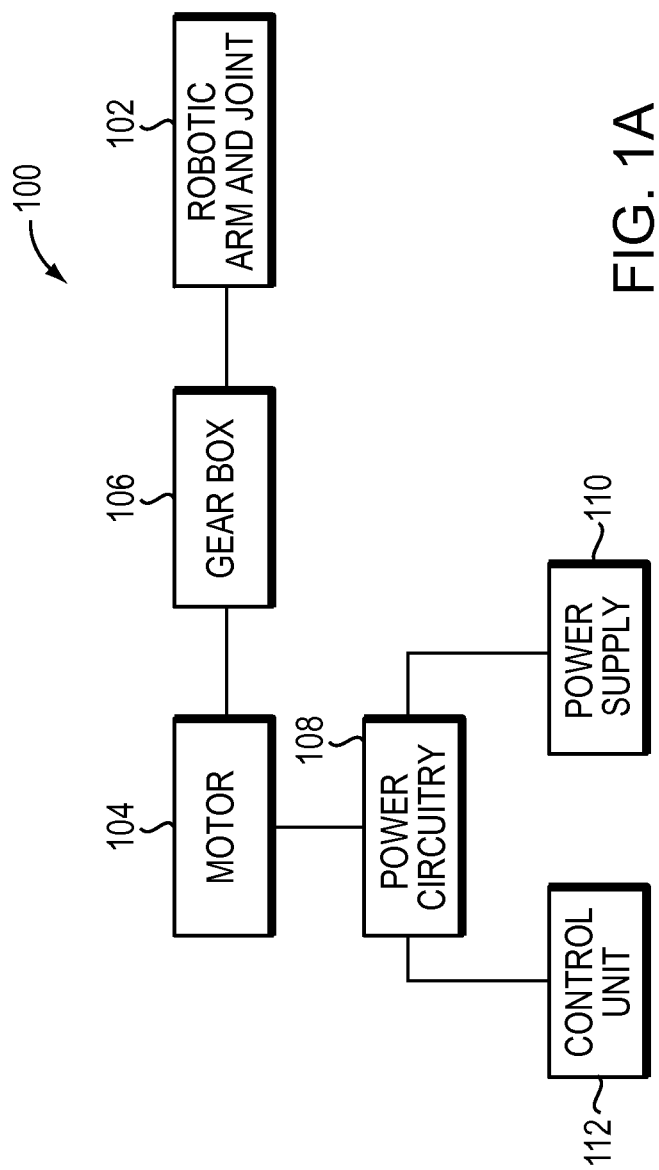
FIG. 1A schematically illustrates a robotic arm driven by a motor that is regulated by power circuitry and a control unit.
Figure 1C:
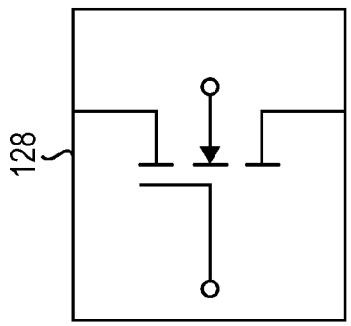
FIGS. 1B and 1C depict parts of the power circuitry that provides power to the motor.
Figure 1B:
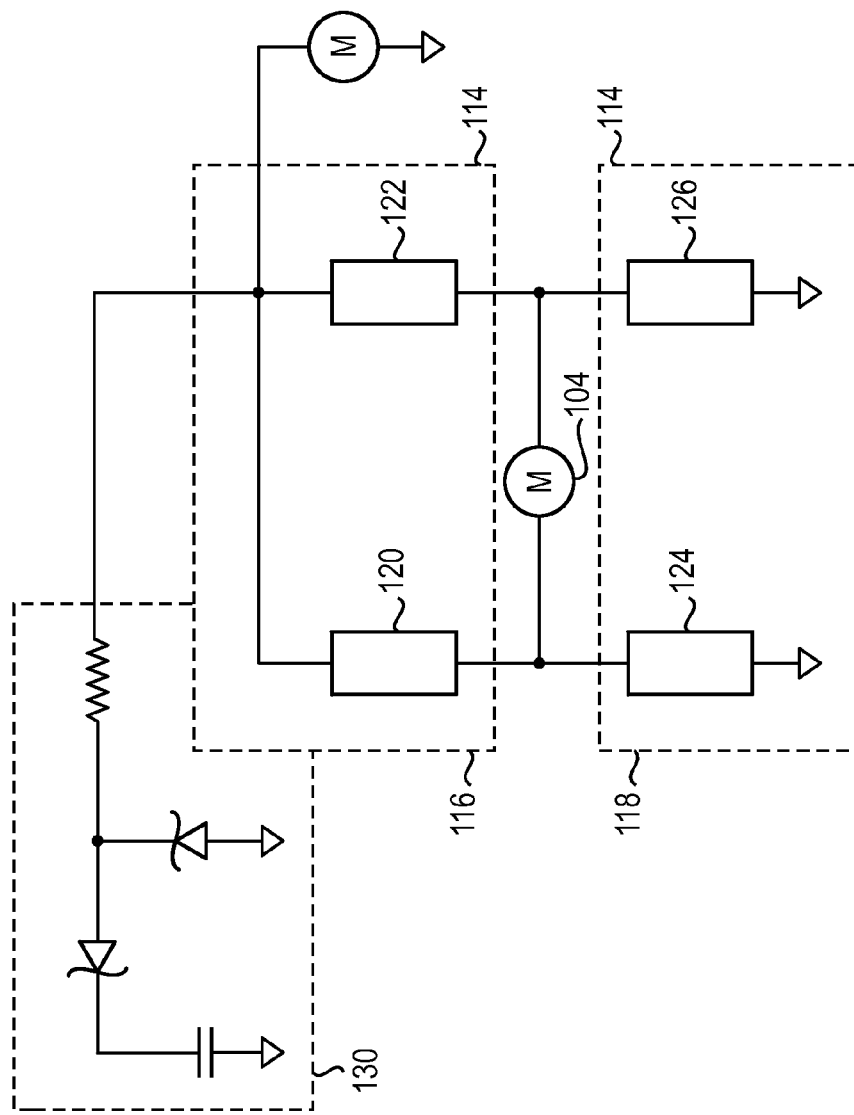

Refer first to FIG. 1A, which illustrates a robotic system 100 having a robotic arm with joint 102 driven by a motor 104 via a gearbox 106. Rotation of the motor 104 generates low-friction motion in the gearbox 106 and is converted into a desired movement of the robotic joint 102 for performing physical manipulations. The motor 104 may be, for example, a single-phase, two-phase, or three-phase AC permanent magnet (PM) motor or a DC PM motor (such as a three-phase brushless DC motor). In various embodiments, the motor 104 is actuated by power circuitry 108 that is supported by a power supply 110 (e.g., 110 or 220 AC volts) and regulated by a control unit 112. The control unit 112 governs the speed and direction of the motor rotation to control various degrees of robotic arm motional freedom while performing robotic actions. Referring to FIG. 1B, in some embodiments, the power circuitry 108 includes an inverter 114 having a bridge circuit (e.g., an H-bridge) to convert an input DC voltage to an output AC voltage with an adjustable amplitude and frequency; the converted output voltage is then fed from the bridge circuit to the motor 104 to cause rotation. Although a single-phase motor is described herein for simplicity, other types of motors—e.g., two-phase and three-phase motors—are within the scope of the current invention.

The illustrated bridge circuit has a first half-bridge 116 and a second half-bridge 118, each having two semiconductor switches 120, 122 and 124, 126, respectively. If PNP transistors are utilized in the semiconductor switches, associated suppressor diodes (not shown) may be necessary to protect the circuit. In a preferred embodiment, the semiconductor switches are implemented with N-channel power MOSFETs 128, as shown in FIG. 1C; the suppressor diodes are replaced by a "body diode" that is internal to the MOSFETs and a byproduct of the device structure. When switches 122 and 124 are activated and switches 120 and 126 are deactivated, a positive voltage is applied across the motor 104; when switches 120 and 126 are activated and switches 122 and 124 are deactivated, the voltage is reversed, allowing reverse operation of the motor. The voltage polarity of the motor 104 thus alternates during an applied power cycle. In some embodiments, the power circuitry 108 includes charge-storage circuitry 130 to store charge when the power is on (i.e., motor 104 is provided with power); this stored charge may be used to support braking during an emergency stop or power failure. The charge-storage circuitry 130 may have, for example, one or more capacitors or other devices that can store electric charge or energy.

Figure 2A:
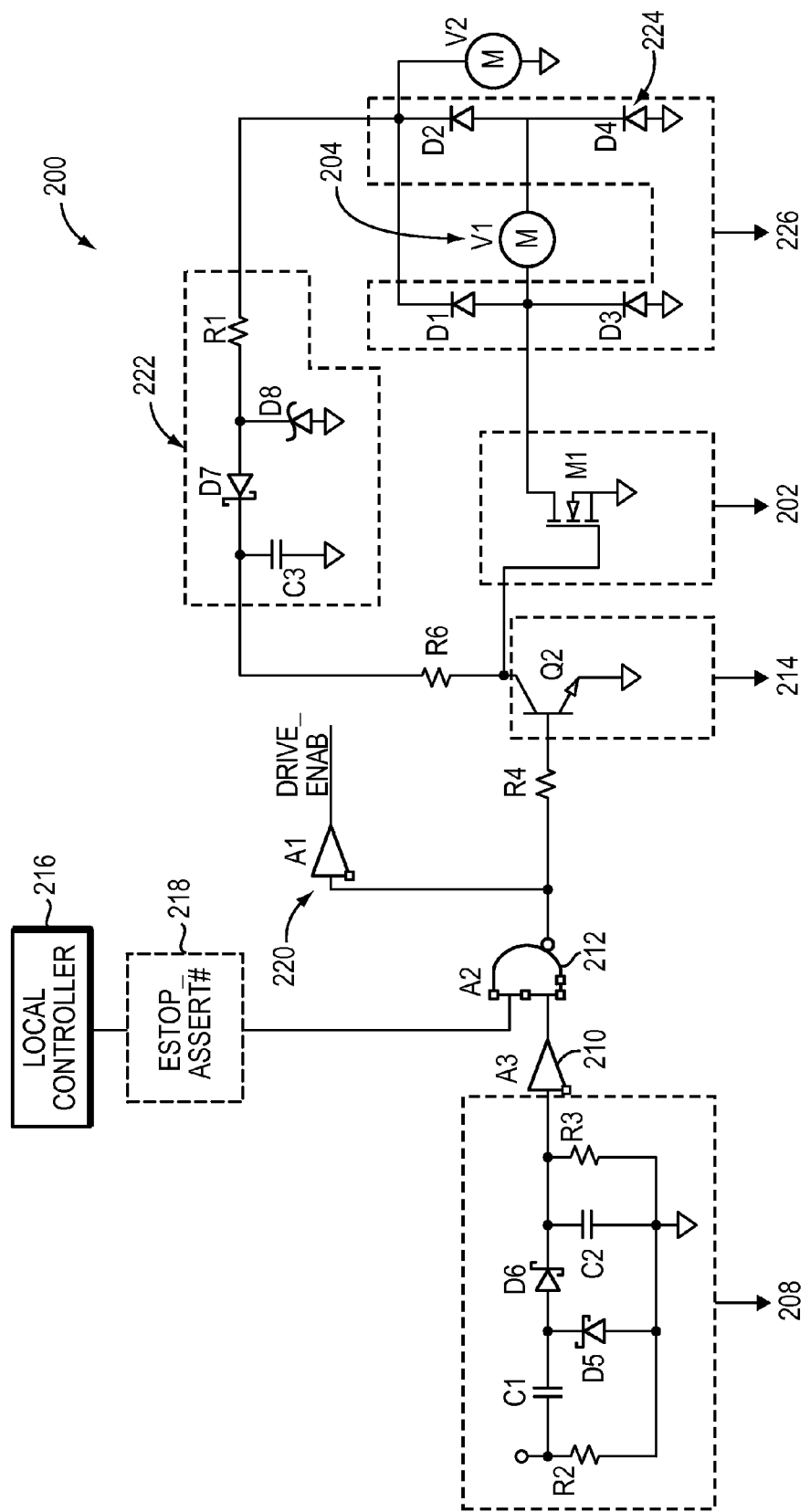
FIG. 2 depicts braking circuitry for generating braking to the motor during an emergency stop or power failure in accordance with an embodiment of the current invention.

During an emergency stop ("estop") or upon a power loss, the semiconductor switches in the first and second half-bridges are deactivated (or off) due to the power loss and the power circuit of the motor system is disabled. Referring to FIG. 2A, the motor system 200 may include emergency braking circuitry 202 as further described below. In various embodiments, a receiver circuit 208 is employed in the motor system 200 to receive an emergent signal indicating estop or power failure from a heartbeat-oscillator circuit or an operator actuated estop (not shown). The receiver circuit 208 subsequently transmits the signal to a pair of Schmitt-trigger gates 210, 212. The Schmitt-trigger gates 210, 212 typically output a constant voltage unless the input voltage signal changes sufficiently (i.e., falls below a predetermined threshold value) to trigger a change; the Schmitt-trigger gates 210, 212 are substantially immune to noise. Therefore, when they receive a below-threshold voltage signal from the receiver circuit 208, the Schmitt-trigger gates 210, 212 output a logic-low signal, which turns off a semiconductor switch 214. A local controller 216 may locally generate and transmit an ESTOP_ASSET signal 218 to the Schmitt-trigger gate 212 for activating the braking circuit 202 based on fault detection functions thereof. Additionally, the local controller 216 may sense a remote estop condition signal through the gate 220 upon cessation of the heartbeat signal. In one embodiment, a gate 220 is used to simulate the enable and disable timing for the switch 214.

The semiconductor switch 214 controls the activation and deactivation of the emergency braking circuitry 202. If the semiconductor switch 214 is activated (i.e., the motor 204 is driven by the power circuitry, as described above), the voltage provided to the emergency braking circuitry 202 will be insufficient to activate it; but if the semiconductor switch 214 is deactivated, charge stored in charge-storage circuitry 222 is converted to an output voltage sufficient to activate the emergency braking circuitry 202. In one embodiment, the emergency braking circuitry 202 includes a FET and the voltage is provided from the charge-storage circuitry 222 to the gate terminal of the FET, thereby activating the FET switch. In the illustrated embodiment, the emergency braking circuitry 202 connects to a suppressor or body diode 224 in the bridge circuit 226 to create a short-circuit path of the motor winding. Upon an emergency stop or power loss, the motor 204 continues to rotate due to inertia; a current induced by the motor rotation flows throw the suppressor or body diode 224 and the emergency braking circuitry 202 to dissipate the energy and thus generate motor braking. Because the braking circuitry 202 connects to only one suppressor or body diode in the bridge circuit, the induced current is conducted away (and applies braking) every half-cycle of the motor rotation. This approach to braking has a smaller duty cycle than that of entire-cycle braking (full duty cycle), thereby allowing the motor to gradually slow down and/or respond to a back drive. In some embodiments, the braking circuitry 202 includes a pair of transistors, each connecting to a suppressor or body diode in the bridge circuit 226 to apply full-duty cycle braking. Accordingly, a motor-driven robotic arm can gradually return to a safe gravity-neutral position and may be moved by an external force to avoid trapping a human operator. Braking is applied until no further current is induced by the motor rotations (i.e., the motor fully stops) to ensure the safety of the motor system 200. Additionally, because the braking torque is generated by current circulation that is itself induced by the motor rotations, the braking torque is proportional to the rotational velocity of the motor. A large torque is generated when braking a high-speed rotating motor and a small torque is generated when braking a motor operating at a low speed. This further ensures safety of the motor system 200.

Figure 2B:
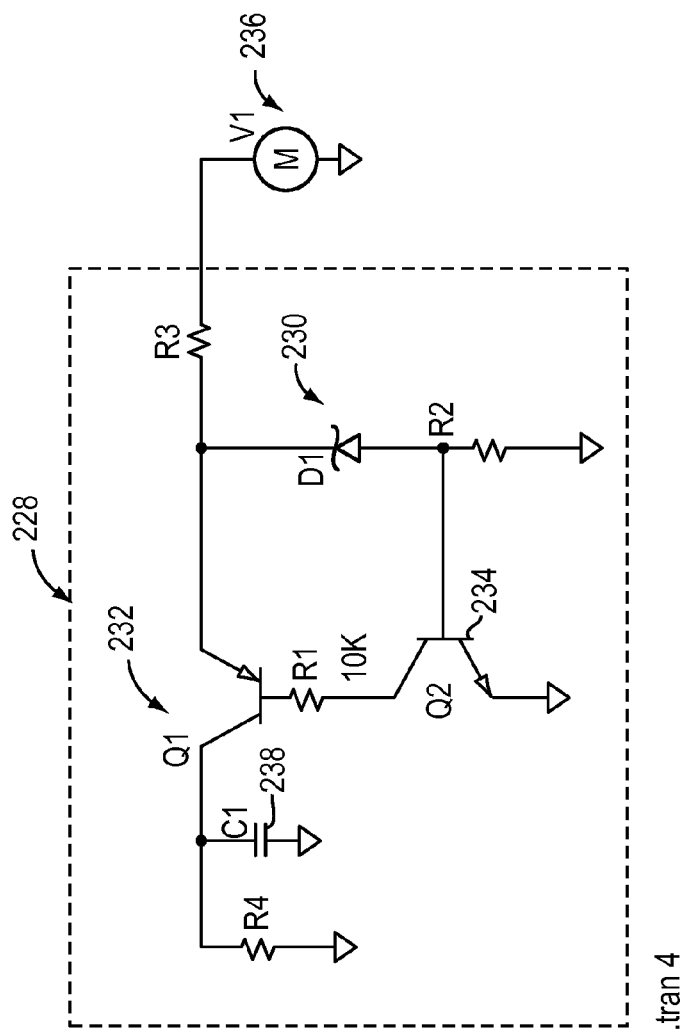

In various embodiments, the FET in the emergency braking circuitry 202 is separate from the semiconductor transistor switches (e.g., 120, 122, 124, and 126 in FIG. 1B) that switch driving currents through the motor 204; this results in the need for significantly less energy to operate the braking circuitry 202 (as compared with incorporating the emergency braking circuitry in the semiconductor switches), and operation of the braking circuitry 202 will be easier to sustain upon power loss. In one embodiment, the charge-storage circuitry 222 includes a capacitor and a diode that steadily provide a gate voltage (for example, of approximately 8.2V) to the FET in the emergency braking circuitry 202 to maintain the FET gate voltage during the emergency stop or power failure. Other electronic circuitry that stores charge or energy during regular robotic operations (i.e., power on) and provides the stored charge or energy to activate the emergency braking circuitry 202 for generating motor braking without activating the semiconductor switches in the bridge circuit is within the scope of the invention. In various embodiments, emergency braking is applied to rapidly rotating joints only. Referring to FIG. 2B, the charge-storage circuitry 228 may include a zener diode 230 that has a breakdown voltage of, for example, 8.2 V, and two transistors 232, 234. For a slowly rotating joint, the output of the motor power bus 236 is usually below the zener breakdown threshold voltage; the transistor 232 thus is off. If, however, the joint is back-driven rapidly enough to regenerate a sufficient voltage above the zener breakdown threshold voltage, a current may start to flow through the BE junction of the switch transistor 234, thereby turning on the transistor 232 and charging the capacitor 238. The charged capacitor 238 may then steadily provide a gate voltage to the FET in the braking circuitry 202, as described above.

Figure 3:
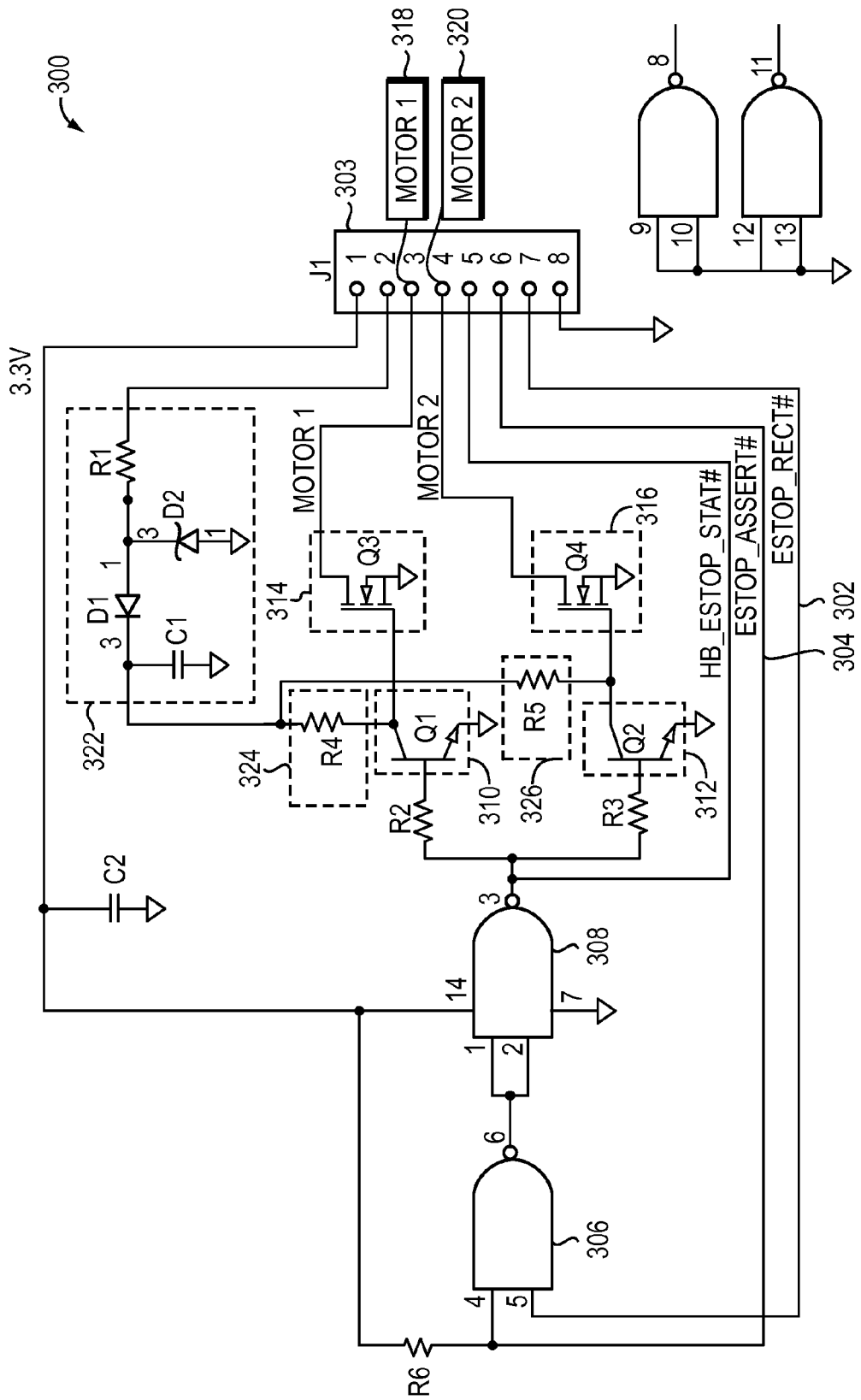
FIG. 3 depicts braking circuitry employed in a two-motor driving system.

With reference to FIG. 3, the emergency braking circuit described above may be employed in a two-motor driving system 300. A voltage signal 302 that detects the power status of a two-motor drive board 303 and a signal 304 that is regulated by a local controller (not shown) via the drive board 303 are ORed by a pair of series-connected NAND gates 306, 308, which may be Schmitt-trigger gates. The output signal of the NAND gates 306, 308 is fed back to the two-motor drive board 303 and transmitted to two semiconductor switches 310, 312. The switches 310, 312 each control the activation or deactivation of the emergency braking circuitry 314, 316 for braking the two motors 318, 320, respectively. Upon detecting a power failure from signal 302 or an emergency signal 304 transmitted from the local controller, the semiconductor switches 310, 312 are turned off and charge-storage circuitry 322 converts the stored charge to an output voltage for activating the emergency braking circuitry 314, 316. Again, currents induced by the two motor rotations may then be recirculated along the activated emergency braking circuitry 314, 316 and the suppressor or body diodes (not shown) connected thereto, thereby short-circuiting the motor windings and dissipating the rotational energy of the motors 318, 320. The switches 310, 312 may absorb a peak current pulse (approximately 300 mA) during discharge of the charge-storage circuitry 322 to avoid damage to the emergency braking circuitry 314, 316. In one embodiment, the charging time of the emergency braking circuitry 314, 316 through resistors (having approximately 100 kΩ resistance) 324, 326, respectively, is much slower than the disable time for deactivating the power bridge circuitry (approximately 120 ns). As a result, the braking system is activated only after the motors lose power from the power bridge circuitry. In some embodiments, the emergency braking circuitry 314, 316 is designed such that the activation time is approximately within 40 ns, smaller than the minimum time to enable the semiconductor switches in the power bridge circuit (approximately 60 ns); this prevents simultaneous activations of the emergency braking circuitry 314, 316 and the switches in the power bridge circuit, thereby ensuring braking is applied to the motors 318, 320. In addition, the electronic components used in the braking circuitry are robust and may have compact packages and low cost such that the braking circuitry implemented in the motor system is reliable and economical.

In various embodiments, the local controller may be provided as either software, hardware, or some combination thereof. For example, the controller may be an embedded-class microprocessor. In one embodiment, the motor controller includes ARM-9 core microcontrollers, on board RAM, and flash memories. Other microcontrollers (such as pulse-width modulation timers) that are optimized for motor control and provide the necessary peripherals are within the scope of the current invention. In another embodiment, the controller is implemented on one or more server-class computers, such as a PC having a CPU board containing one or more processors such as the Core Pentium or Celeron family of processors manufactured by Intel Corporation of Santa Clara, Calif. and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD). In some embodiments, the programs may be provided using external RAM and/or ROM such as optical disks, magnetic disks, as well as other commonly used storage devices.

For embodiments in which the local controller is provided as a software program, the program may be written in any one of a number of high level languages such as FORTRAN, PASCAL, JAVA, C, C++, C#, LISP, PERL, BASIC, PYTHON or any suitable programming language. Additionally, the software can be implemented in an assembly language and/or machine language directed to the microprocessor resident on a target device.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An unpowered braking system for braking a cyclically rotating motor, the system comprising:
    at least one passive electrical element for conducting current induced by motor rotations without activating a bridge circuit powering the motor; and charge-storage means, connected to said at least one passive electrical element, for storing charge and converting the stored charge to an output voltage;

voltage-actuated circuitry for braking the motor upon activation by a braking voltage; and control circuitry for controlling activation and deactivation of the voltage-actuated circuitry, the control circuitry being (i) connected to the charge-storage circuitry to receive the output voltage therefrom and (ii) responsive to a braking signal to boost a voltage at the voltage-actuated circuitry from a non-braking voltage to the braking voltage.

2. The system of claim 1, wherein the voltage-actuated circuitry is connected across a motor winding and brakes the motor by short-circuiting the motor winding by causing current to flow therethrough.

3. The system of claim 1, further comprising a bridge circuit that itself comprises a plurality of transistors.

4. The system of claim 1, further comprising a logic gate to control activation and deactivation of the voltage-actuated circuitry.

5. The system of claim 4, wherein the logic gate is regulated by at least one of a controller or a signal indicating a power status.

6. The system of claim 5, wherein the voltage-actuated circuitry is activated when an output of the logic gate is below a predetermined minimum voltage threshold.

7. The system of claim 5, wherein the voltage-actuated circuitry is deactivated when an output of the logic gate is above a predetermined maximum voltage threshold.

8. The system of claim 1, wherein the charge-storage circuitry comprises a capacitor.

9. The system of claim 1, wherein the passive electrical element comprises a diode.

10. The system of claim 1, wherein the voltage-actuated circuitry comprises a transistor.

11. The system of claim 1, wherein the voltage-actuated circuitry is activated each half-cycle of motor rotation.

12. The system of claim 1, wherein the voltage-actuated circuitry is activated at a full-duty cycle of motor rotation.

13. The system of claim 1, wherein the charge-storage circuitry comprises a zener diode having a breakdown voltage threshold and at least one transistor, wherein the at least one transistor is inactive until actuated by a sufficient voltage above the zener breakdown threshold voltage.

14. A method of generating motor braking, the method comprising:

storing charge in a charge-storage element, storage charge means connected to at least one passive electrical element, for storing charge and converting the stored charge to an output voltage;

converting, by the charge-storage element, the stored charge to an output; and absent a braking signal, applying the output from the charge-storage element to voltage-actuated braking circuitry at a voltage level insufficient to cause braking and, upon assertion of the braking signal, causing the output from the charge-storage element to be applied to the braking circuitry at a braking level to cause braking of the motor.

15. The method of claim 14, wherein the braking circuitry is connected across a motor winding and brakes the motor by causing current to flow through the motor winding, the motor winding being short-circuited each half-cycle of motor rotation.

16. The method of claim 14, wherein the braking circuitry is connected across a motor winding and brakes the motor by causing current to flow through the motor winding, the motor winding being short-circuited at a full-duty cycle of motor rotation.

17. The method of claim 14, wherein the braking circuitry is connected across a motor winding and brakes the motor by causing current to flow through the motor winding, the motor winding being short-circuited when a speed of motor rotation is above a threshold value.

* * * * *